(12) United States Patent
Ieda

(10) Patent No.: US 6,962,295 B2
(45) Date of Patent: Nov. 8, 2005

(54) THERMOSTAT FOR AN AUTOMATIC HYDRAULIC TRANSMISSION SYSTEM

(75) Inventor: João José Cardinali Ieda, Vila Independencia (BR)

(73) Assignee: Wahler Metalurgica LTDA, Piracicaba (BR)

( * ) Notice: Subject to any disclaimer, the term of this patent is extended or adjusted under 35 U.S.C. 154(b) by 0 days.

(21) Appl. No.: 10/747,351

(22) Filed: Dec. 29, 2003

(65) Prior Publication Data

US 2005/0145706 A1    Jul. 7, 2005

(51) Int. Cl.[7] .......................... F01P 7/02; G05D 23/00
(52) U.S. Cl. ..................... 236/34.5; 236/50; 236/93 R; 137/334; 137/468
(58) Field of Search ............................ 236/34.5, 93 R, 236/50; 251/11; 137/334, 468

(56) References Cited

U.S. PATENT DOCUMENTS

| | | | | | |
|---|---|---|---|---|---|
| 2,454,297 A | * | 11/1948 | Worth | ........................ | 236/34.5 |
| 2,458,547 A | * | 1/1949 | Worth | ........................ | 236/34.5 |
| 3,682,380 A | * | 8/1972 | Aziz | ........................ | 236/34.5 |
| 3,913,831 A | * | 10/1975 | Talak | ........................ | 236/34.5 |
| 4,190,198 A | * | 2/1980 | Casuga et al. | ............. | 236/34.5 |
| 4,370,950 A | * | 2/1983 | Furukubo | ................ | 123/41.08 |
| 4,410,133 A | * | 10/1983 | Furukubo | ................... | 236/34.5 |
| 5,791,557 A | * | 8/1998 | Kunze | ........................ | 236/34.5 |
| 6,499,666 B1 | * | 12/2002 | Brown | ........................ | 236/34.5 |
| 6,719,208 B2 | * | 4/2004 | Brown | ........................ | 236/34.5 |
| 2004/0232249 A1 | * | 11/2004 | Brown et al. | ............. | 236/34.5 |

* cited by examiner

*Primary Examiner*—Marc Norman
(74) *Attorney, Agent, or Firm*—William J. Sapone; Coleman Sudol Sapone PC

(57) ABSTRACT

The present invention has a by-pass thermostat assembly (1) that is connected to the oil circulation system of an automatic hydraulic transmission system of an internal combustion or other engine. The assembly includes a block or a case (4) with an inner housing (5) to locate a thermostatic valve within a casing (7) that acts as a piston sliding along the housing, and being biased by a spring. The housing (5) is covered by an end plug (11). The thermostatic valve is located in the housing, and in conjunction with an inner housing (5), has are two parallel channels (13 and 14) which are open in the posterior part of the block or case (4), where they receive two conduits (15) coupling to an oil/air exchanger, the two channels being in communication with respective holes (16 and 17), which are coupled to the transmission (18) through appropriate connections (20), such that the thermostatic valve is responsive to the oil temperature, opening the channel to the oil/air exchanger when the oil is hot, and closing when the oil is cold to by-pass the cooling circuit such that an optimum transmission oil temperature is achieved.

4 Claims, 7 Drawing Sheets

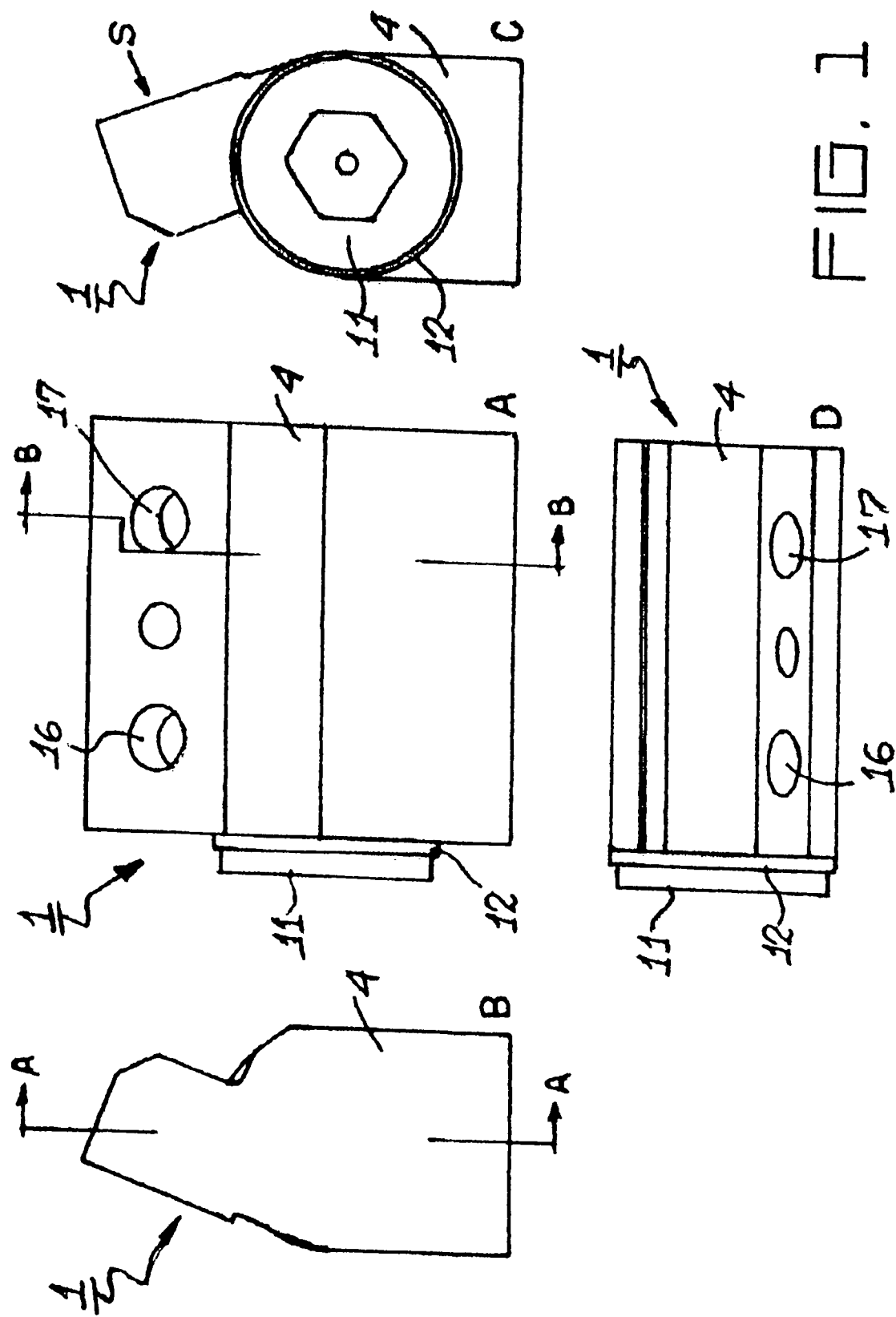

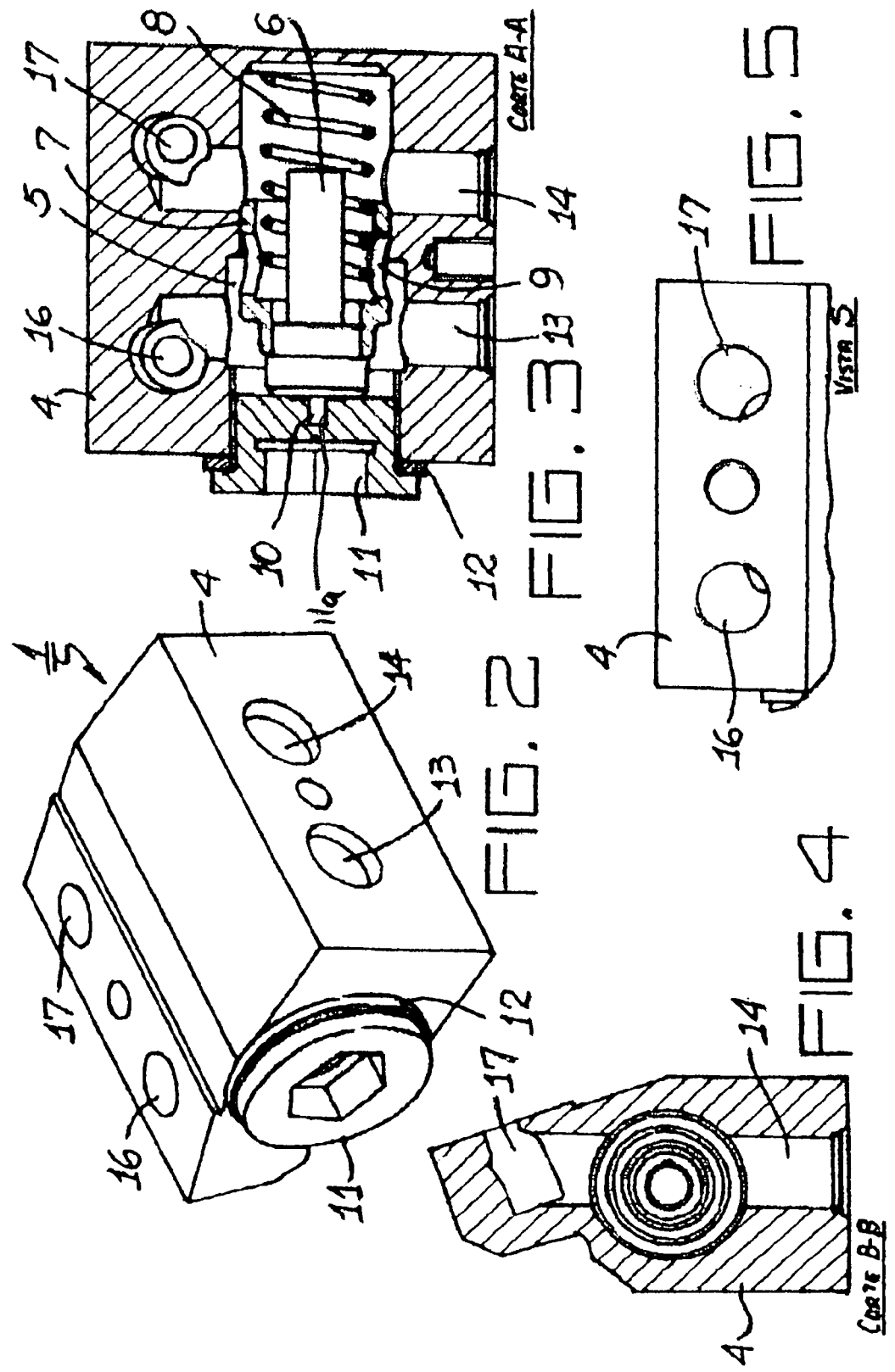

2

THERMOSTAT FOR AN AUTOMATIC HYDRAULIC TRANSMISSION SYSTEM

BACKGROUND

The present invention is directed to the application of a thermostat in an automatic hydraulic transmission system for use in vehicles with internal combustion or other types of engines. The invention preserves the mechanical and functional qualities of the vehicle and the system, while allowing the performance of the automatic gearbox to be improved, as the transmission oil is preserved by temperature control which enables the viscosity characteristics of the transmission oil to be optimized, as well as improving the durability and characteristics of the transmission system, such as response time, and driveability. That is, there is a reduction in the time required for gear shifting. In order to have the lubricating oil working at a constant and ideal temperature, it is necessary to have, in the cooling system, a means that could perform such a function. Accordingly, a system and a product have been conceived, as the main objects of the present invention, which consists of the application of a thermostat for use in the control of the temperature of the hydraulic fluid used in automatic gearboxes and transmission systems associated with internal combustion or other engines.

It is very important and absolutely necessary to include the thermostat in the temperature control system of the lubricating oil in the automatic gearboxes and in the transmission system used with internal combustion engines and other engines, to control the temperature of the transmission, assuring good lubrication performance, by optimizing the viscosity characteristics of the oil.

Therefore, the main objective of the present invention is to control the work temperature of the automatic gearbox/ gears, by conducting the oil into an oil/air heat exchanger when the oil temperature is above the optimum working conditions, or bypassing the oil so it remains in the lubrication circuit when at other oil temperatures. This also assures the best engine performance with respect to emitted pollutants.

The thermostat basically consists of a thermostatic valve that is disposed in the interior of a housing with a joint seal, constituting a unique integrated assembly, wherein the assembly is applied to an oil/air cooler integrated with the internal combustion engine to control the temperature of the lubricating oil. The thermostat may have varied constructions and have varied forms of fitting/sealing, by means of a screw thread, a snap ring, or by crimping. By controlling the temperature of the automatic transmission oil, it is possible to assure:

minor variation of the viscosity characteristic of the oil;
better quality of transmission response during gear shifting;
better driveability of the vehicle;
less time for gear shifting;
better working temperature of the transmission system during the initial period of engine operation (warm-up).

BRIEF DESCRIPTION OF THE DRAWINGS

In order to have a clear understanding of what is being proposed in the present invention, illustrative drawings are attached, to which references are made in order to better illustrate the following detailed description.

FIGS. 1a, b, c and d show a front plan view (A), a right side view (B), a left side view (C) and a top plan view (D), respectively, of the thermostat for controlling the temperature of the oil used in an automatic gearbox and transmission system.

FIG. 2 shows a general perspective view of the thermostat.

FIG. 3 shows a cross sectional view, taken along line A—A of FIG. 1.

FIG. 4 shows a cross sectional view, taken along line B—B of FIG. 1.

FIG. 5 shows a detail "S" of the thermostat, as indicated in FIG. 1.

DETAILED DESCRIPTION OF THE INVENTION

Figure 6:
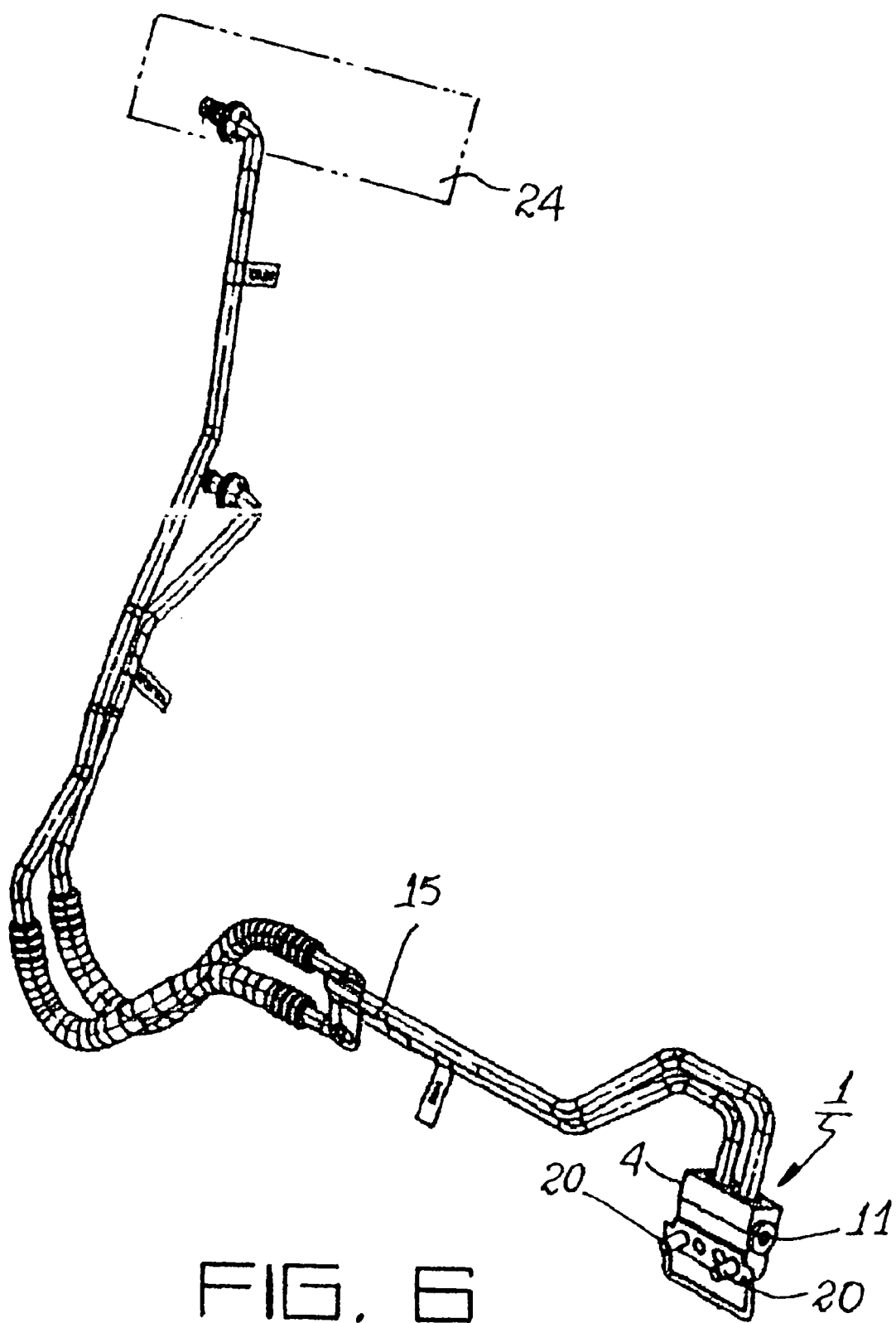
FIG. 6 shows a perspective view of the thermostat having coupling piping connected to a radiator.
Figure 7:
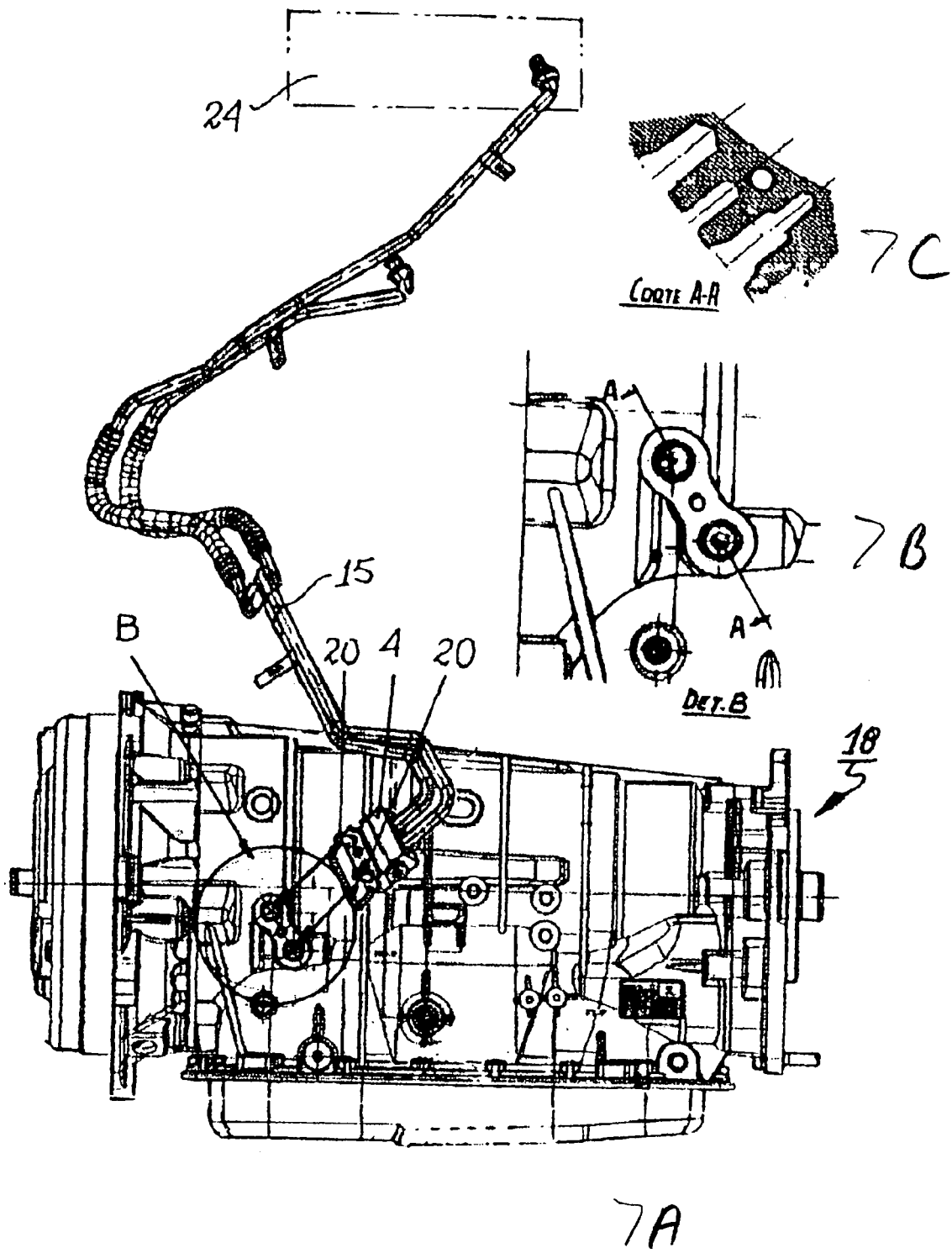
FIG. 7a shows a perspective view of the thermostat with coupling piping connected to a radiator and in the assembled position at the oil/air cooler.
FIG. 7b shows the thermostat coupled to the automatic gearbox.
FIG. 7c shows a cross sectional view in detail, taken along line A—A in FIG. 7b.
Figure 8:
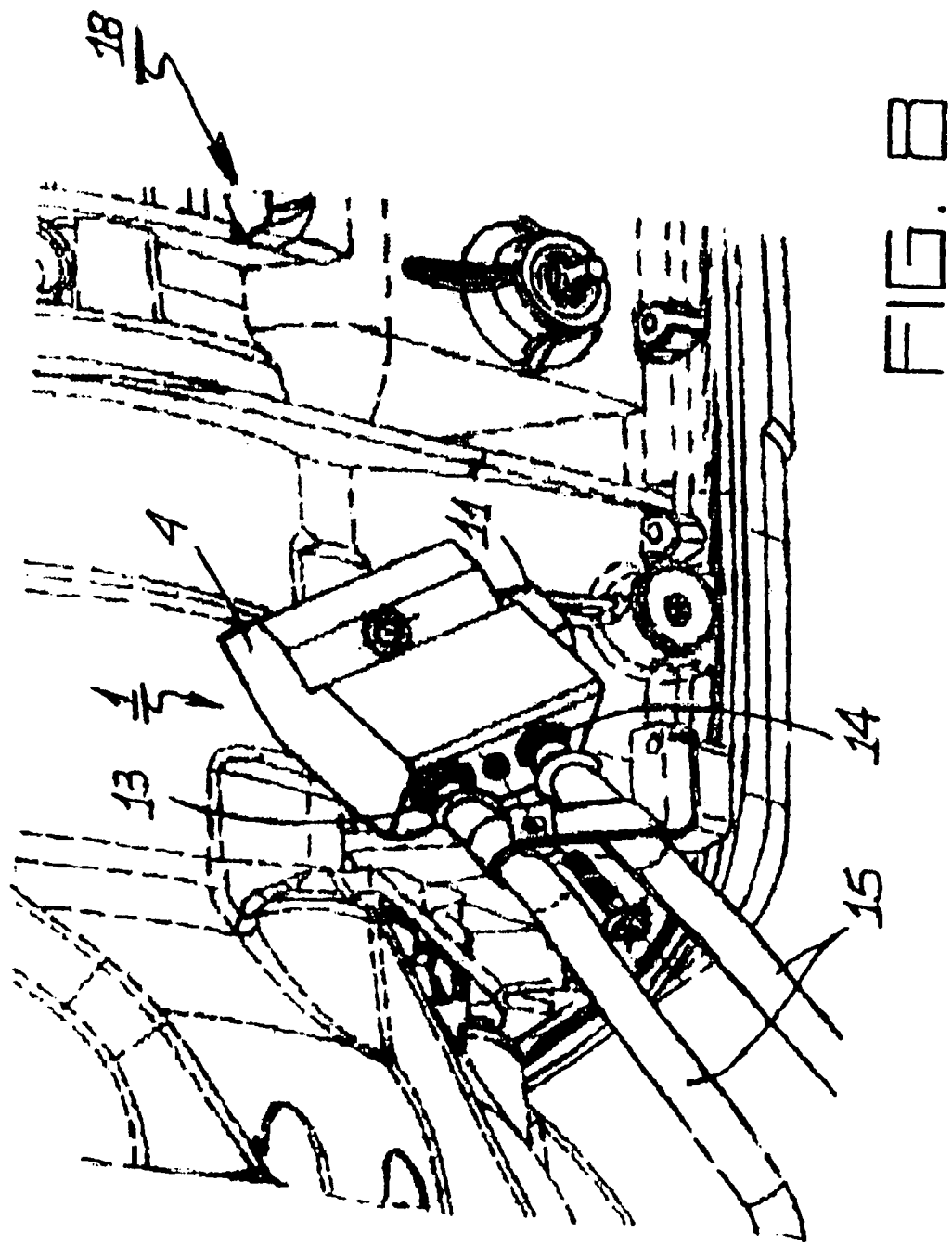
FIG. 8 shows in detail the thermostat connected to the oil/water cooler to control the temperature thereof.

In accordance with these illustrations and their respective details, referring to FIGS. 1–5, a by-pass thermostat assembly (1) is connected to an automatic hydraulic transmission system of an internal combustion or other engine, characterized by comprising a block or a case (4) preferably made of a thinner and lighter-weight injected or extruded aluminum material, having a joint sealing system for mounting onto a gearbox block. The block or case (4) has an inner housing (5) where the thermostatic valve is located. The thermostat valve is generally composed of a working element or temperature sensor (6), partially enveloped by a tubular cylindrical casing (7) that acts as a piston sliding along the housing, which is subject to the action of a spring (8) that is supported on a bottom of the tubular casing on one side, and on another si de, it is supported on the bottom of the housing (5). The piston is provided with four holes (9) located in four opposing points of its circumference in a two-to-two arrangement.

The working element or temperature sensor (6) of the thermostatic valve has on its top a central guide pin (10) that is inserted into a blind hole (11a) in a blanking/sealing plug (11) of the housing (5), which is sealed by means of a sealing ring (12).

Figure 11:
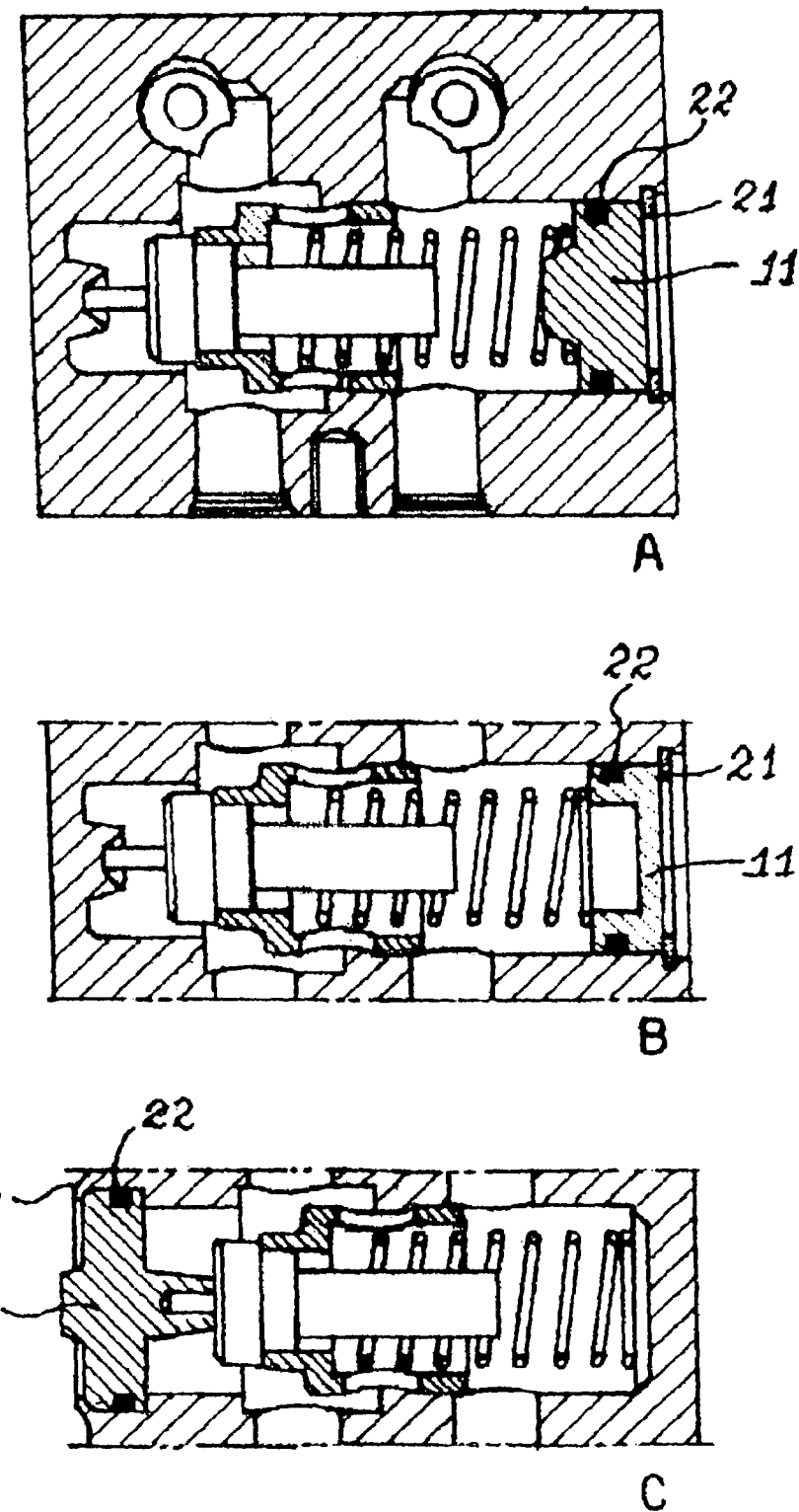
FIGS. 11a, b and c show cross sectional views of the thermostat with varied forms of plug fitting/sealing.

The fitting of blanking/sealing plug (11) of the thermostatic valve housing (5) can be made in several ways, such as, for example, as shown in FIG. 3, by threading the plug through the threaded mouthpiece of the housing; or by means of a snap ring (21) with a ring seal (22), as shown in FIGS. 11A and 11B; or by means of crimping (23), as illustrated in FIG. 12C. Together with the inner housing (5), there are two interconnected parallel channels, wherein one is an oil return channel (13)—from the radiator, and the other is an oil supply channel (14)—to the radiator, the latter being in communication with the space above the piston, and the other being in communication with the space below the piston.

Both channels (13 and 14) are open in the posterior part of the block or case (4), where they receive two conduits

(15) coupling to the radiator (24). The channels are almost completely elongated into the opposing end of the block or case (4), where they are in communication with the respective holes, wherein one of them is a supply hole (16)—to the gearbox, and the other is a return hole (17)—from the gearbox. Both holes are open in the supralateral face of the block or case (4), wherein the holes are designed to be coupled to the oil circular system of the gears (18) through appropriate connections (20).

Figure 9:
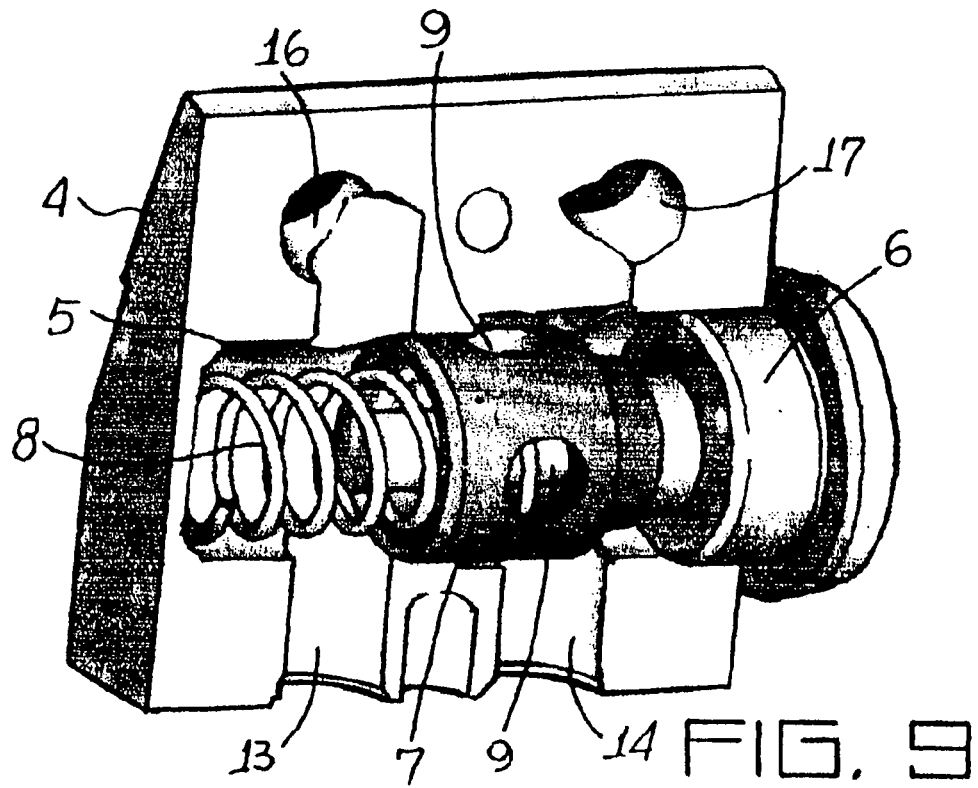
FIGS. 9 and 10 show two cross sectional views of the thermostat detail, though the thermostat can have other varied constructions that are not shown in these figures.
Figure 10:
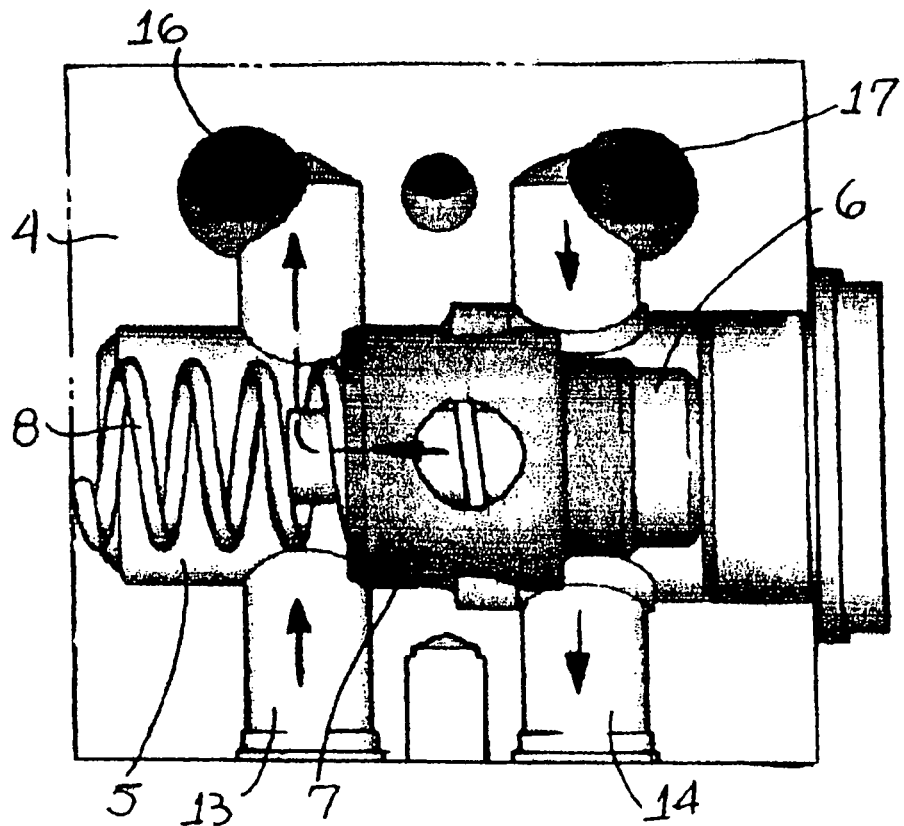

Referring to FIGS. 9 and 10, when the oil is cold, the gearbox passage (17) to the radiator is blocked by means of a piston shifting (7), and the oil circulates through the by-pass system, through holes 9 (see arrow of FIG. 10) returning to the gearbox through passage 16. When the oil is hot, the passage 17 is opened to passage 14, and the gearbox oil flows to the radiator, through passage 14, where it is cooled and then it returns through passage 13 to the passage 16, passing into the gearbox 18.

While preferred embodiments of the present invention have been shown and described, it will be understood by those skilled in the art that various changes or modifications can be made without varying from the present invention.

What is claimed is:

1. A system for controlling the temperature of an oil used in an automatic hydraulic transmission system comprising:
   an oil/air heat exchanger;
   a by-pass thermostat assembly connected to the automatic hydraulic transmission system and to the heat exchanger, the by-pass thermostat assembly having a block having an inner housing for receiving a thermostatic valve therein, the block having an oil inlet passage for receiving oil from the transmission, an oil outlet passage for supplying oil to the heat exchanger, an oil inlet passage for oil returning from the heat exchanger and an oil outlet passage leading the oil back to the transmission, the passages being in fluidic communication through the inner housing, the thermostatic valve having a working element or temperature sensor engaged with and partially enveloped in a tubular casing, the thermostatic valve having a guide pin which extends into a hole in an end plug, which closes an end of the inner housing, for centralizing the working element or temperature sensor in the inner housing, the tubular casing forming a piston slidable within the inner housing in response to a temperature of the oil acting on the working element or temperature sensor, the piston having an open end in proximity to the oil outlet passage leading back to the transmission, the piston being biased by a spring disposed between a bottom of the housing and the piston into a position where the piston blocks the oil outlet passage to the heat exchanger, the piston having four holes located in four opposing points of its circumference in a two by two arrangement, the holes being in fluid communication with the piston open end for bypassing oil therethrough, the piston movable between a first position where oil flows from the oil inlet passage from the transmission to the oil outlet passage to the heat exchanger, and a second position where the piston blocks the oil outlet passage to the heat exchanger and oil flows through the boles and open end back to the transmission system.

2. The system of claim 1 wherein the block is made of an aluminum material.

3. The system of claim 1 wherein the oil inlet passage from the transmission and the oil outlet passage to the heat exchanger are located on a first side of the piston, the oil inlet passage from the heat exchanger and the oil outlet passage to the transmission being on a second side of the piston, the passages to and from the heat exchanger being coupled to conduits coupled to the heat exchanger.

4. The system of claim 1 wherein the end plug is fitted to the block by a structure selected from the group consisting of threads, a snap ring with seam sealing or a crimped engagement.

* * * * *